United States Patent [19]
Yamada

[11] Patent Number: 5,616,974
[45] Date of Patent: Apr. 1, 1997

[54] FAN MOTOR

[76] Inventor: Tadao Yamada, 3-9-9 Inadera, Amagasaki City, Hyogo-ken 655, Japan

[21] Appl. No.: 340,603

[22] Filed: Nov. 16, 1994

[51] Int. Cl.$^6$ .................................................. H02K 1/18
[52] U.S. Cl. ........................................ 310/68 B; 310/261
[58] Field of Search ............................ 310/68 B, 72, 310/181, 261, 262, 263; 361/11, 12

[56] References Cited

U.S. PATENT DOCUMENTS

| | | | |
|---|---|---|---|
| 4,553,075 | 11/1985 | Brown | 310/63 |
| 4,952,915 | 8/1990 | Jenkins | 310/68 B |
| 5,148,070 | 9/1992 | Frye | 310/68 B |
| 5,296,775 | 3/1994 | Cronin | 310/62 |
| 5,337,030 | 8/1994 | Mohler | 310/68 B |
| 5,440,185 | 8/1995 | Allwine, Jr. | 310/68 B |
| 5,455,474 | 10/1995 | Flynn | 310/181 |
| 5,463,263 | 10/1995 | Flynn | 310/181 |

*Primary Examiner*—Steven L. Stephan
*Assistant Examiner*—Judson H. Jones
*Attorney, Agent, or Firm*—Susan E. Nagel

[57] ABSTRACT

The present invention is a fan motor for use in various types of electronic equipment, more particularly fan motors which may cool heat radiating electronic parts, in which the object is (a) to prevent noise caused by the air-cutting sound of the fan motor, (b) to allow easy alteration of the blowing direction, and (c) to eliminate damage caused by the counter electromotive force of the field magnetic coil.

The fan motor of the present invention consists of (a) a rotor formed by installing permanent magnets on a vane wheel, and (b) a stator formed by installing an electromagnet and a magnetic body on the inside circumferential surface of a casing. A circumferential-edge ring is installed on the vane wheel, so that noise caused by the air-cutting sound of the fan motor is prevented. A conductive circuit is connected to the field magnetic coil of the electromagnet, and the aforementioned magnetic body can be selectively positioned in a relatively advanced angular position ($P_1$) or a relatively retarded angular position ($P_2$) with respect to the electromagnet. A diode ($D_2$) which eliminates any surge voltage caused by the counter electromotive force of the field magnetic coil is installed in the conductive circuit.

4 Claims, 4 Drawing Sheets

FAN MOTOR

BACKGROUND OF THE INVENTION

1. Field of the Invention

The field of the invention concerns fan motors for use in various types of electronic equipment, more particularly fan motors which may cool heat-radiating electronic parts.

2. Background Information

Conventionally, the overheating of heat-radiating electronic parts has been prevented by installing heat-radiating plates with heat-radiating fins in close contact with said electronic parts. Heat-radiating plates depend on natural heat radiation, however, and therefore have a poor heat radiation efficiency. Furthermore in order to maintain the heat radiation efficiency at a given level, it is necessary to increase the height of the heat-radiating fins, and as a result, such heat-radiating plates are bulky and occupy a large installation space.

Accordingly the present applicant previously proposed a fan motor (Japanese Patent Application No. 6-137701) as a device which is superior to heat-radiating plates in terms of heat radiation efficiency, cost, and size.

Specifically, said fan motor consisted of a rotor which is constructed by installing a plurality of permanent magnets at prescribed relative angles on the circumferential rim portion of a vane wheel, and a stator which is constructed by installing one or more electromagnets and at least one magnetic body on the inside circumferential portion of a casing. A conductive circuit is connected to the field magnetic coils of the electromagnets, and the magnetic body is positioned in a prescribed relatively offset angular position (P) with respect to the electromagnets. Furthermore, a detector which detects when the permanent magnets of the vane wheel are in the vicinity of the relatively offset angular position (P), and which accordingly connects the conductive circuit, is attached to the inside circumferential portion of the casing. When this conductive circuit is in an "off" state, the magnetic force of the permanent magnets of the vane wheel acts respectively on the cores of the electromagnets and the magnetic body so that the vane wheel is offset toward the aforementioned relatively offset angular position (P). When the conductive circuit is in a conductive state, the repulsive force of the electromagnets acts on the permanent magnets so that the vane wheel is caused to rotate.

There may be occasions where the aforementioned fan motor is mounted on electronic parts of audio equipment in which an extremely high sound quality is required. In such cases, even the slight air-cutting noise generated by the fan motor may become an annoyance.

Furthermore, there may be a need to change the blowing direction after the fan motor has been mounted on the electronic parts, which would require either to change the direction of installation of the fan motor, or to alter the wiring of the conductive circuit.

Moreover, the fan motor is constructed so that the proximity of the permanent magnets of the vane wheel to the relatively offset angular position (P) is detected by the detector, and the conductive circuit is switched on only during this period. Accordingly, each time the field magnetic coils are switched off, a surge voltage is generated by the counter electromotive force of said field magnetic coils. There is a danger that this surge voltage might damage electronic equipment.

The present invention has improved upon the aforementioned problems.

SUMMARY OF INVENTION

The present invention was devised in light of the aforementioned facts, and undertakes to achieve the following technical tasks:

(1) Preventing the air-cutting noise of the fan motor from becoming an annoying noise even in audio equipment, where an extremely high sound quality is required.

(2) Making it possible to change the blowing direction after the fan motor has been mounted on electronic parts, without any need to change the direction of installation of the fan motor or the wiring of the conductive circuit.

(3) Eliminating surge voltages caused by the counter electromotive force of the field magnetic coil so that there is no damage to electronic equipment.

In order to solve the aforementioned problems, the present invention has improved the aforementioned fan motor as follows:

In the previous invention, the air blown in the centrifugal direction by the vanes strikes the inside circumferential surface of the stator, so that an annoying air-cutting noise is generated and diffused.

In the proposed invention, however, the circumferential edge portions of the vanes of the vane wheel are connected by the aforementioned circumferential-edge ring across the entire width of said vanes (with respect to the axial direction). As a result, the air which is blown in the centrifugal direction by the vanes is guided by the circumferential-edge ring which rotates together with said vanes, so that said air is directed in the regular blowing direction, thus eliminating the aforementioned annoying air-cutting noise.

In addition, in the proposed invention, the relatively offset angular position (P) of the magnetic body (or bodies) is set so that a selection is possible between a relatively advanced angular position ($P_1$) and a relatively retarded angular position ($P_2$) with respect to the electromagnet(s). Accordingly, the direction of rotation of the fan motor can easily be changed merely by switching the position of the magnetic body (or bodies) between the relatively advanced angular position ($P_1$) and relatively retarded angular position ($P_2$). In other words, in cases where it is necessary to change the blowing direction, this can be accomplished without changing the direction of installation of the fan motor or the wiring of the conductive circuit.

Also, in the proposed invention, a diode ($D_2$) is provided which is connected in parallel with each field magnetic coil, and which absorbs the surge voltage of said field magnetic coil when the conduction of the conductive circuit is stopped. Accordingly, the surge current generated each time that the aforementioned field magnetic coil is switched off flows through a closed circuit formed by said field magnetic coil and the aforementioned diode ($D_2$), so that the energy of said surge current is consumed. As a result, any surge voltage generated by the counter electromotive force of the aforementioned field magnetic coil is eliminated, so that there is no damage to the electronic equipment.

The proposed invention is also characterized by the fact that the fan motor may be constructed so that the relatively advanced angular position ($P_1$) and relatively retarded angular position ($P_2$) (with respect to the electromagnet(s)) are set at respective equal angular positions (theta) from adjacent permanent magnets and of the vane wheel in a non-conductive state, and permanent magnet(s) are used for the magnetic body (or bodies), thus causing repulsion of the permanent magnets of the vane wheel. Accordingly, in a case where a magnetic body using a permanent magnet is mounted in the aforementioned relatively advanced angular position ($P_1$), an attractive force acts between one of the permanent magnets of the vane wheel and the core of the electromagnet when the device is in a non-conductive state, and a weak repulsive force acts between the adjacent permanent magnets of the vane wheel and the magnetic body (permanent magnet), so that the vane wheel is slightly offset toward the relatively advanced angular position ($P_1$) (with respect to the electromagnet).

When power is applied in this state, the permanent magnet of the vane wheel is subjected to the repulsive force of the electromagnet, and begins to rotate in the clockwise direction (F). In this case, the weak repulsive force between the permanent magnets of the vane wheel and the magnetic body (permanent magnet) (6) does not offer any substantial resistance to the starting rotational force; accordingly, the starting rotation is smooth.

Furthermore, the magnetic body (using a permanent magnet) is subjected to the mutual repulsive force (negative force) of the adjacent permanent magnet; however, since a rotational force which is sufficient to overcome this repulsive force is imparted by the electromagnet, the aforementioned permanent magnet passes through the relatively advanced angular position ($P_1$). Afterward, a strong mutual repulsive force (positive force) acts between the aforementioned permanent magnet and the magnetic body (permanent magnet), so that the vane wheel is strongly accelerated in the clockwise direction (i. e., in the direction indicated by arrow F).

BRIEF DESCRIPTION OF THE DRAWINGS

FIG. 1 illustrates the fan motor of the present invention.

FIG. 6 illustrates a fan motor of the prior art.

DESCRIPTION OF THE PREFERRED EMBODIMENT

Figure 1A:
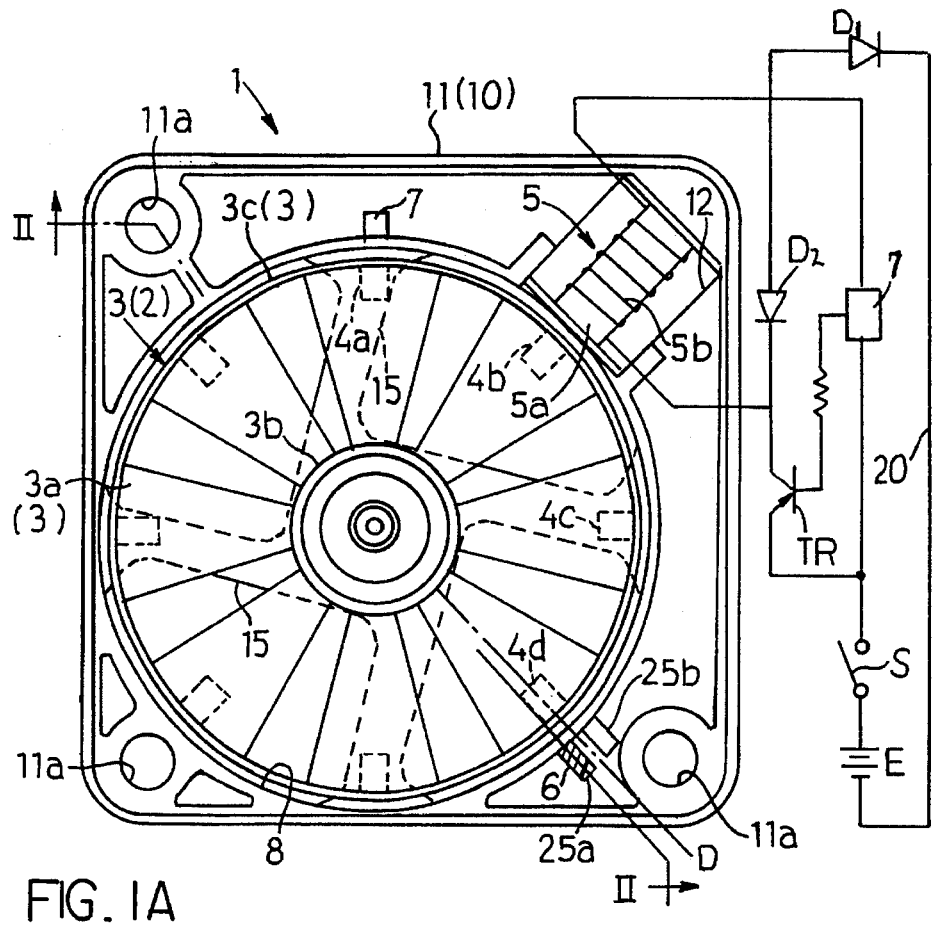
FIG. 1(A) is a plan view of the fan motor.
Figure 1B:
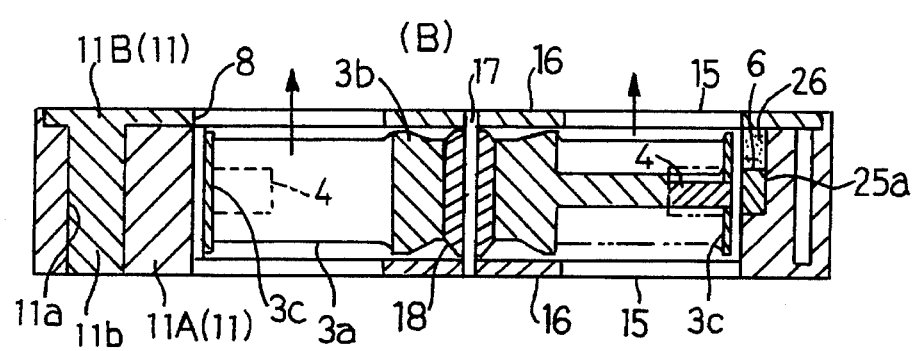
FIG. 1(B) is an arrow-view longitudinal section along line II—II in FIG. 1(A)
Figure 1C:
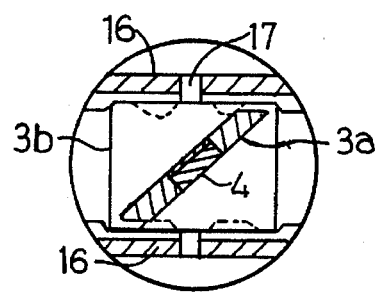
FIG. 1(C) is a magnified longitudinal section of the vane parts of the fan motor.

As is shown collectively in FIGS. 1A, 1B, 1C and 2, the fan motor (1) consists of a rotor (2) formed by fastening permanent magnets (4a) and (4b) and (4c) and 4(d) show in FIG. 1A, to the circumferential rim portion of a vane wheel (3), and (b) a stator (10) formed by installing one detector (7), one electromagnet (5) and one magnetic body (6) in prescribed relatively advanced angular positions ($P_1$) or relatively retarded angular positions ($P_2$) (below, these positions will be referred to collectively as relatively offset angular positions ($P_1$) or ($P_2$) on the inside circumferential portion of a casing (11).

Figure 2:
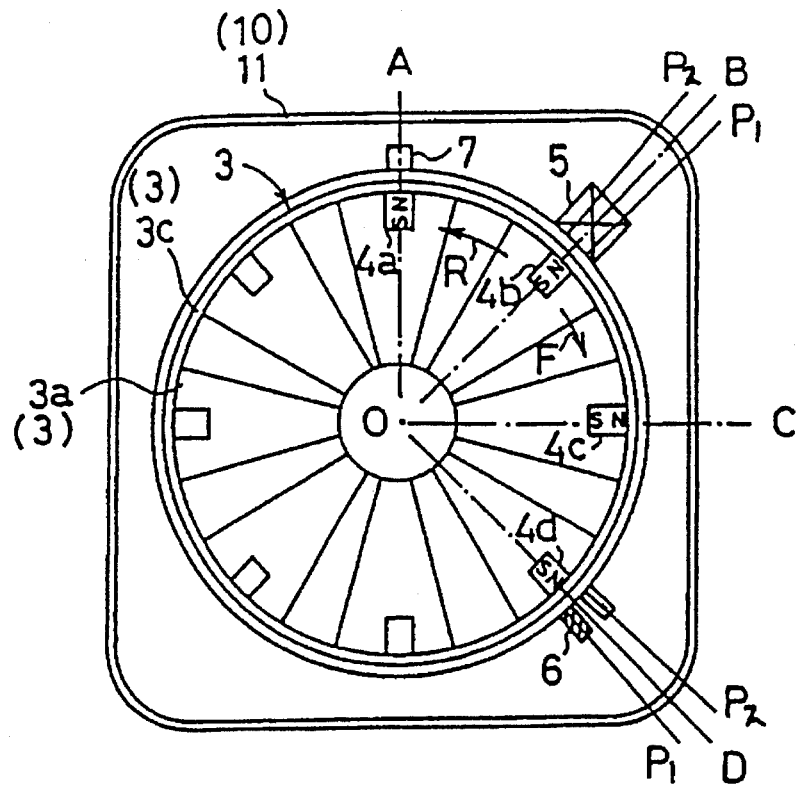
FIG. 2 is an explanatory diagram which illustrates the schematic construction of the fan motor.

As is shown in FIGS. 1 and 2, the casing (11) is formed by tightly fastening attachment projections (11b) formed on an upper frame (11B) in attachment holes (11a) formed in three corners of case frame main body (11A). A vane wheel (3) is installed inside an air passage (8) formed in the central portion of the casing (11), and a detector (7) is mounted on one side of the case frame main body (11A) facing the inside circumferential surface of the air passage (8). Furthermore, a recess (12) is formed in one corner of the case frame main body (11A) facing the aforementioned inside circumferential surface, and an electromagnet (5) is mounted in this recess (12). In addition, four vane wheel supporting arms (15) which face toward the central portion of the air passage (8), and supporting shaft bosses (16), are formed as integral parts of the aforementioned case frame main body (11A) and upper casing (11B), and the vane wheel (3) is supported so that it is free to rotate by a supporting shaft (17) which is supported by the paired bosses (16, 16).

The vane wheel (3) consists of (a) 8 vanes (3a), (b) a wheel boss part (3b) to which the base part of each of the aforementioned vanes (3a) is integrally fastened, (c) a circumferential-edge ring (3c) to which the circumferential edge portions of the respective vanes (3a) are connected across the entire width of each vane (3a) (with respect to the axial direction of said vane (3a)), (d) a shaft supporting part (18) which is inserted between the supporting shaft (17) and the wheel boss part (3b), and (e) the aforementioned supporting shaft (17). The aforementioned circumferential-edge ring (3c) is constructed so that the air which is blown in the centrifugal direction by the vanes (3a) is guided by said circumferential-edge ring (3c), which rotates as a unit with said vanes (3a), so that said air is directed in the regular blowing direction. The installation of the aforementioned circumferential-edge ring (3c) eliminates annoying air-cutting noise.

The electromagnet (5) is constructed by winding a field magnetic coil (5b) around a core (iron core) (5); this field magnetic coil (5b) is connected to a conductive circuit (20) (which will be described later).

The magnetic body (6) is formed from a ferromagnetic material such as a piece of iron, etc., and is selectively mounted in one of two recesses (25a) and (25b) shown in FIG. 1 which are formed in adjacent to each other in two places.

FIG. 2 shows a schematic construction of the fan motor. This figure is an explanatory diagram which is used to facilitate understanding of the positional relationships of the permanent magnets (4a) through (4d) installed on the vane wheel (3), and the detector (7), electromagnet (5) and magnetic body (6) installed on the stator (10).

In FIG. 2, the one-dot chain lines which connect points (A), (B), (C) and (D) (noted on the side of the stator (10)) with the axial center (0) of the vane wheel (3) indicate positions which are identical in relative terms with respect to the electromagnet (5). As is shown in FIG. 2, the aforementioned recesses (25a) and (25b) are respectively formed in a relatively advanced angular position ($P_1$) which is offset by an offset angle of approximately 2.5° in the clockwise direction (indicated by arrow F) with respect to point (D), i.e., with respect to the electromagnet (5), and a relatively retarded angular position (P2) which is offset by an offset angle of approximately 2.5° in the counterclockwise direction (indicated by arrow R) with respect to point (D), i.e., with respect to the electromagnet (5). This is done in order to allow free selection of the direction of rotation of the fan motor (1).

The starting rotation of the vane wheel (3) is in the clockwise direction (indicated by arrow F) when the magnetic body (6) is mounted in the relatively advanced angular position ($P_1$), and the starting rotation of the vane wheel (3) is in the counterclockwise direction (indicated by arrow R) when the magnetic body (6) is mounted in the relatively retarded angular position ($P_2$).

When the device is in a non-conductive state, the aforementioned detector (7) detects when the permanent magnet (4a) of the vane wheel (3) is in the vicinity of the relatively advanced angular position ($P_1$) or relatively retarded angular position ($P_2$), and connects the conductive circuit (20).

In a case where the magnetic body (6) is mounted in the relatively advanced angular position ($P_1$) attractive forces act between the permanent magnet (4b) of the vane wheel (3) and the core (5a) of the electromagnet (5), and a weak attrative force acts between the permanent magnet (4d) of tile vane wheel (3) and the magnetic body (6) when the power supply switch (S) is "off", i.e., when the supply of current is stopped. Accordingly, the vane wheel (3) stops in a position which is slightly offset toward the relatively advanced angular position ($P_1$) (with respect to tile electromagnet (5)).

In this case, the detector (7) detects that one of the permanent magnets (4a) of the vane wheel (3) is in the vicinity of the relatively advanced angular position ($P_1$), and closes the conductive circuit (20) so that current can be supplied.

When the power supply switch (S) is switched on in this state, current flows to the field magnetic coil (5b) via the transistor (TR), so that the permanent magnet (4b) which is offset toward the relatively advanced angular position ($P_1$) with respect to the electromagnet (5) receives a strong repulsive force from said electromagnet (5). As a result, the attractive tbrce s acting between the permanent magnet (4d) and the magnetic body (6) is overcome so that the vane wheel (3) begins to rotate in the direction indicated by arrow F.

When the vane wheel (3) begins to rotate so that the permanent magnet (4d) recedes from the relatively advanced angular position ($P_1$), the detector (7) opens the conductive circuit (20) via the transistor (TR), so that said circuit is placed in a non-conductive state. However, the vane wheel (3) continues to rotate as a result of inertia; furthermore, the attractive force of the permanent magnet (4a) again acts on the core (5a) of the electromagnet (5), and the attractive force of the permanent magnet (4c) acts on the magnetic body (6), so that the vane wheel (3) is caused to rotate toward the relatively advanced angular position ($P_1$). As a result, the vane wheel (3) rotates continuously. Furthermore, if the magnetic body (6) is mounted in the relatively retarded angular position ($P_2$), the vane wheel (3) will begin to rotate in the counterclockwise direction (indicated by arrow R) based on the same principle as was described above.

As was described above, the surge current that is generated each time that the field magnetic coil (5b) is switched off flows through a closed circuit formed by the field magnetic coil (5b) and the diode ($D_2$), so that the energy of said surge current is consumed. Accordingly, the surge voltage caused by the counter electromotive force of the field magnetic coil (5b) is eliminated.

Figure 3:
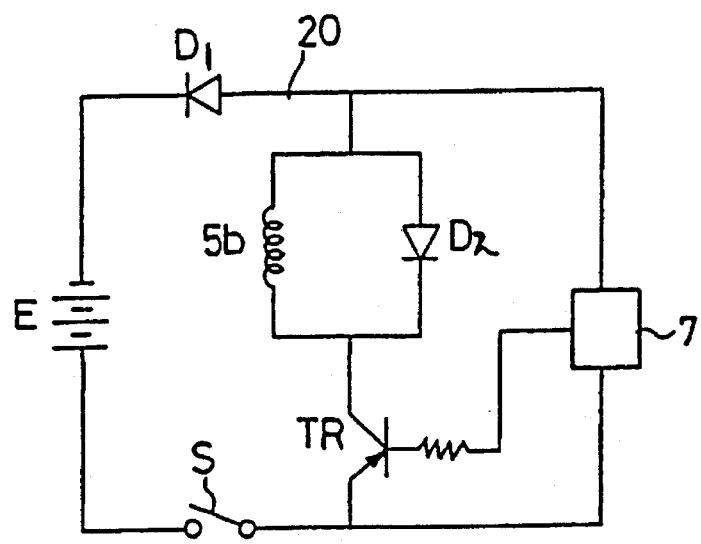
FIG. 3 is an equivalent circuit diagram of the conductive circuit of the fan motor.

FIG. 3 is an equivalent circuit diagram of the aforementioned conductive circuit (20).

As is shown in FIGS. 1(A) and 3, this conductive circuit (20) is equipped with (a) a power supply (E), (b) a power supply switch (S) (which is added if necessary), (c) the field magnetic coil (5b) of the aforementioned electromagnet (5), (d) a diode ($D_2$) which is connected in parallel with the aforementioned field magnetic coil (5b), and which forms a closed circuit with said field magnetic coil (5b) when the conduction of the conductive circuit (20) is stopped, (e) the aforementioned detector, (t) a transistor (TR) which supplies current to the field magnetic coil (5b) based on the detection operation of said detector (7), and (g) a diode (Dr) which is installed in the main circuit.

The aforementioned conductive circuit (20) is constructed so that (a) when the detector (7) performs a detection operation, current is supplied to the field magnetic coil (5b) so that the electromagnet (5) is switched on, and (b) the surge current generated each time that the field magnetic coil (5b) is switched off flows through a closed circuit formed by the field magnetic coil (5b) and diode ($D_2$) so that the energy of said surge current is consumed. As a result, any surge voltage caused by the counter electromotive force of the field magnetic coil (5b) is eliminated, so that there is no damage to the electronic equipment.

Furthermore, the aforementioned conductive circuit (20) is shown in the figures as using a DC power supply (E); however, in cases where a diode ($D_1$) used for AC detection is installed in the main circuit (as shown in the figures), it is also possible to use an AC power supply.

Moreover, from the standpoints of durability, stability and structural simplicity, etc., it is desirable to use a Hall element as the aforementioned detector (7). However, the present invention is not limited to such an element; it would also be possible to use a lead switch or a photoelectric switch, etc. Specifically, any device capable of causing current to be supplied to the field magnetic coil (5b) when the permanent magnets (4) of the vane wheel (3) reach the vicinity of the relatively advanced angular position ($P_1$) or relatively retarded angular position ($P_2$) (with respect to the electromagnet (5)) may be used.

Figure 4:
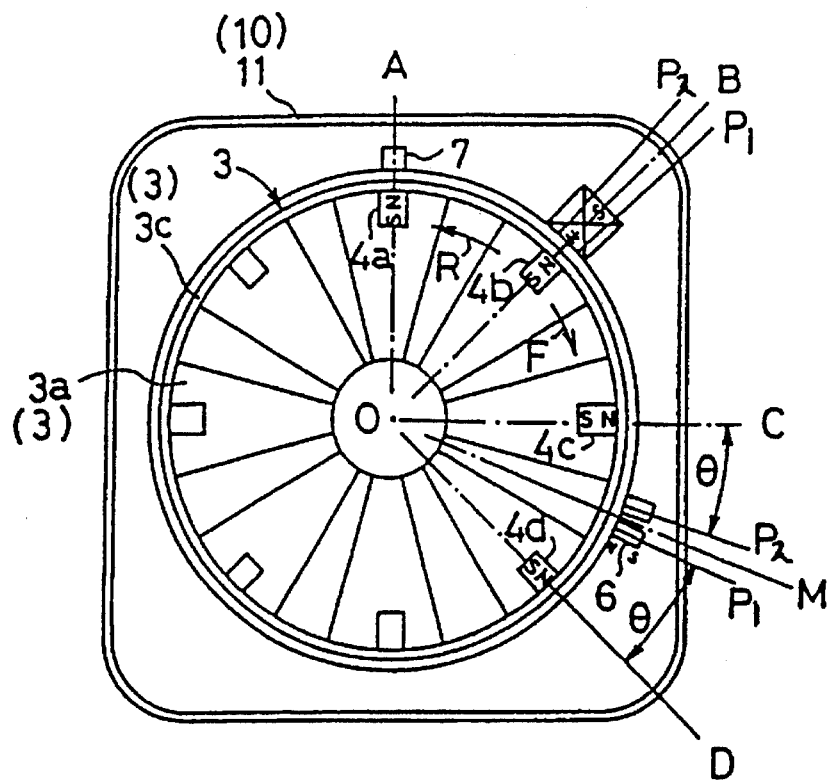
FIG. 4 is an explanatory diagram which illustrates the schematic construction of the fan motor in a second embodiment of the present invention.

FIG. 4 is an explanatory diagram which illustrates the schematic construction of the fan motor in a second embodiment of the present invention.

In this fan motor, an angular position (M) which is intermediate between the aforementioned (C) and (D) is taken as a position which is identical in relative terms to the position of the electromagnet (5). A position which is located 2.5 degrees in the direction indicated by arrow F (with respect to the aforementioned position (M), i.e., with respect to the electromagnet (5)) is set as the aforementioned relatively advanced angular position ($P_1$), and a position which is located 2.5 degrees in the direction indicated by arrow R (with respect to the aforementioned position (M)) is set as the aforementioned relatively retarded angular position ($P_2$).

In other words, the aforementioned relatively advanced angular position ($P_1$) and relatively retarded angular position ($P_2$) are respectively set at equal angular positions (theta) (theta=20 degrees) from the adjacent permanent magnets (4c) and (4d) of the vane wheel (3). Furthermore, a permanent magnet is used as the aforementioned magnetic body (6), thus causing repulsion of the respective permanent magnets (4) of the vane wheel (3). In all other respects, the fan motor constructed similarly to the fan motor in FIG. 2.

In this embodiment, if a magnetic body (6) using a permanent magnet is mounted in the relatively advance angular position ($P_1$), an attractive force acts between one of the permanent magnets (4b) of the vane wheel (3) and the core (5a) of the electromagnet (5), and a weak repulsive force acts between the adjacent permanent magnets (4c, 4d)

of the vane wheel (3) and the magnetic body (permanent magnet) (6), when the device is in a non-conductive state. Accordingly, the vane wheel (3) is slightly offset toward the relatively advanced angular position ($P_1$) with respect to the electromagnet (5).

When current is supplied in this state, the permanent magnet (4b) of the vane wheel (3) is subjected to the repulsive force of the electromagnet (5), so that starting rotation begins in the clockwise direction (indicated by arrow F). In this case, the weak repulsive force between the permanent magnets (4c, 4d) of the vane wheel (3) and the magnetic body (permanent magnet) (6) does not offer any substantial resistance to the starting rotational force; accordingly, the starting rotation is smooth as a result.

In the fan motor in FIG. 2, an attractive force acts between the magnetic body (iron piece) (6) positioned in the relatively advanced angular position ($P_1$) (with respect to position (D)) and the permanent magnet (4d); as a result, a starting rotational force which overcomes this attractive force is necessary. Accordingly, a starting rotation such as that seen in the second embodiment cannot be expected.

Furthermore, the atbrementioned magnetic body (6) using a permanent magnet is subjected to a mutual repulsive force (negative force) by the permanent magnet (4c), which approaches through forward rotation in the direction indicated by arrow F. However, a rotational force which is sufficient to overcome this mutual repulsive force is imparted by the electromagnet (5). Then, after said permanent magnet (4c) has passed through the relatively advanced angular position ($P_1$), a strong mutual repulsive force (positive force) acts between said permanent magnet (4c) and the magnetic body (permanent magnet) (6), so that the vane wheel (3) is strongly accelerated in the clockwise direction (indicated by arrow F).

In the fan motor in FIG. 2, the attractive force of the permanent magnet (4c) (although slight) acts on the magnetic body (iron piece) (6) as a force which weakens the rotational force even after said permanent magnet (4c) has passed through the relatively advanced angular position ($P_1$). In other words, compared to the fan motor in FIG. 2 using a simple magnetic body (iron piece), this second embodiment is advantageous because there is no waste in the power supplied after starting rotation.

Figure 5:
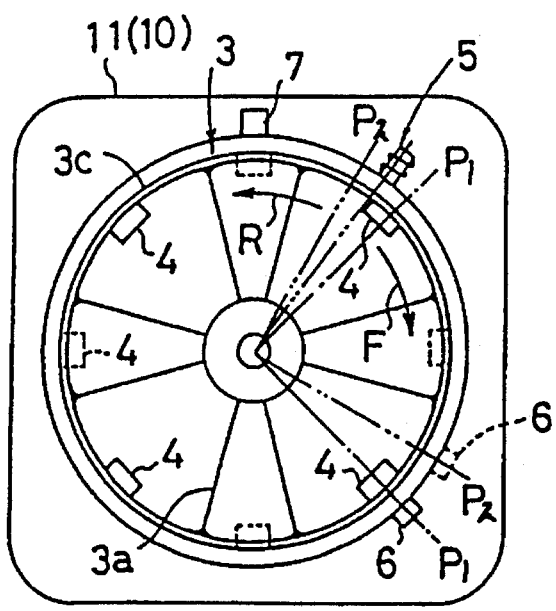
FIG. 5 is an explanatory diagram which illustrates the schematic construction of the fan motor in a third embodiment of the present invention.
Figure 6A:
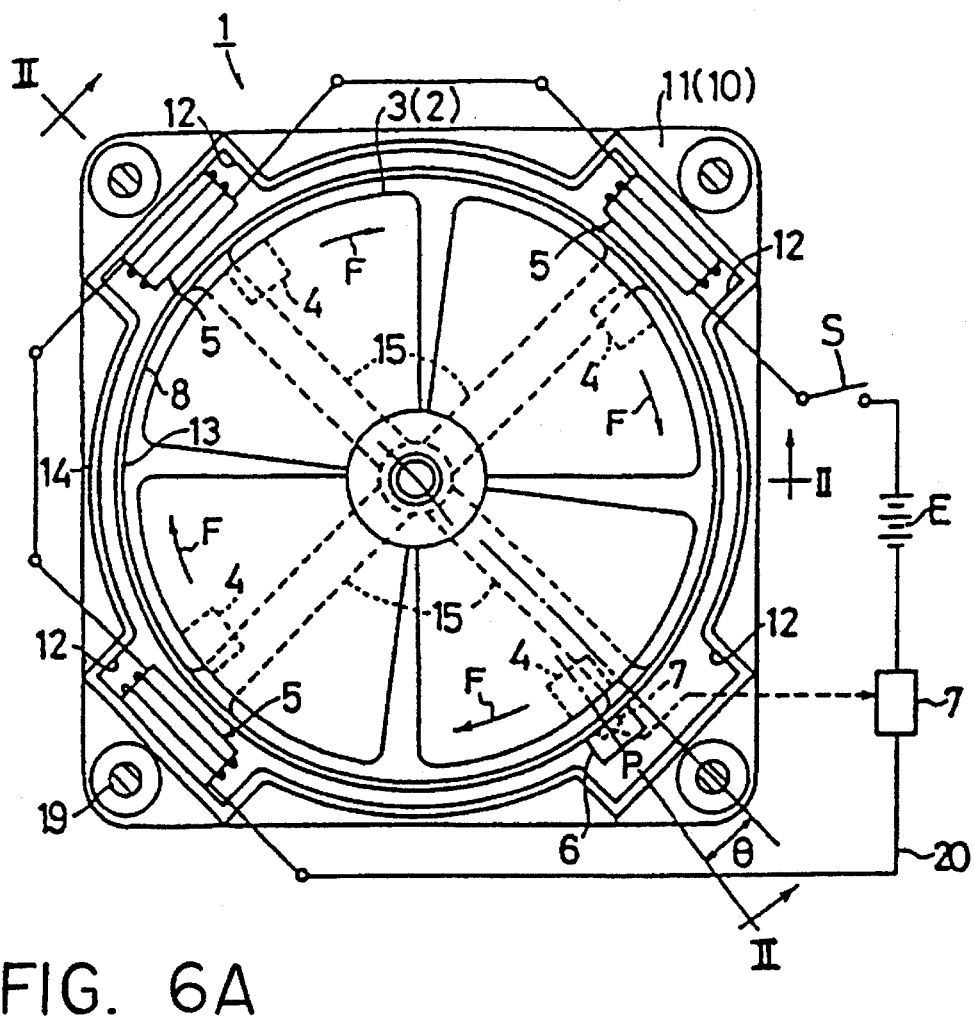
FIG. 6(A) is a plan view of said fan motor.
Figure 6B:
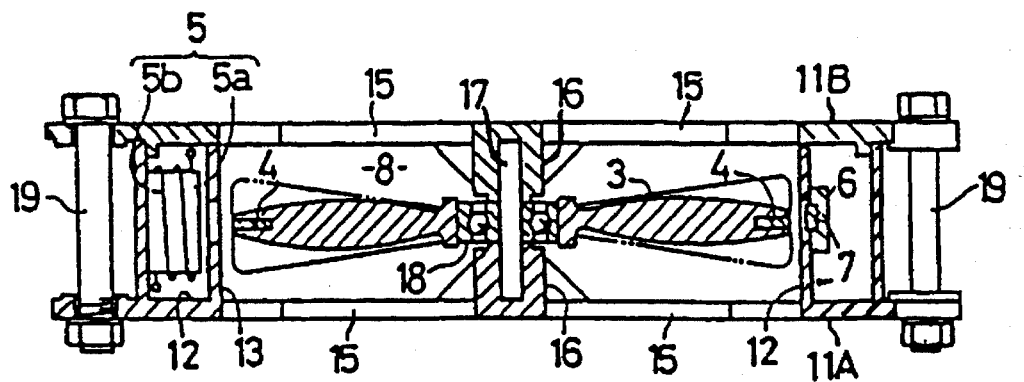
FIG. 6(B) is an arrow-view longitudinal section along line II—II in FIG. 6(A).

FIG. 5 is an explanatory diagram which illustrates the schematic construction of a third embodiment of the fan motor of the present invention. Specifically, in this practical example, four permanent magnets (4) are installed on a vane wheel (3) which has four vanes (3a). Furthermore, four permanent magnets (4) are also installed on the aforementioned circumferential-edge ring (3c) which rotates as a unit with the vanes (3a), and one electromagnet (5) is installed on the inside circumferential surface of the casing (11). In all other respects, this third embodiment is constructed similarly to the fan motor in FIG. 2.

In this embodiment, eight permanent magnets (4) were installed on the vanes (3a) and circumferential-edge ring (3c). However, tile present invention is not limited to such an arrangement. In cases wilere permanent magnets (4) are installed on the circumferential-edge ring (3c), the number of permanent magnets (4) installed is not limited by the number of vanes (3a). Since the permanent magnets (4) can be installed on the circumferential-edge ring (3c) at a fine pitch, the repulsive force imparted by the electromagnet (5) can be applied at a fine pitch, so that a much smoother rotational force is obtained in the fan motor.

Furthermore, in the invention a single electromagnet was used. The present invention is not limited to such an arrangement; it would also be possible to install a plurality of electromagnets (5) as in conventional examples. Moreover, the relatively advanced angular position ($P_1$) and relatively retarded angular position ($P_2$) (advanced and retarded with respect to the electromagnet (5)) were set at±2.5 degrees. However, the present invention is not limited to such an arrangement; this value may be appropriately altered in accordance with the diameter of the rotor.

I claim:

1. I claim, in a fan motor which consists of (i) a rotor (2) which is constructed by positioning a plurality of permanent magnets (4a), (4b), (4c) and (4d) at prescribed relative angles on the circumferential rim portion of a vane wheel (3), and (ii) a stator (10) which is constructed by positioning one or more electromagnet(s) (5) and at least one magnetic body to be placed in one of a plurality of recesses on an inside circumferential portion of a casing (11);

and in which a conductive circuit (20) is connected to a field magnetic coil(s) (5b) of an aforementioned electromagnet(s) (5), (c) the aforementioned recesses [magnetic body (or bodies (6)] are positioned in a prescribed relatively offset angular position ($P_1$) or ($P_2$) with respect to tile aforementioned electromagnet(s) (5) such selection which may be made after installation of such fan motor and such selection which will allow a change of direction of rotation of the vane wheel, (d) a detector (7) which detects when the permanent magnets (4a), (4b), (4c) and (4d) of the vane wheel (3) are in the vicinity of the aforementioned relatively offset angular position ($P_1$) or ($P_2$), and which accordingly connects the aforementioned conductive circuit (20), is attached to the inside circumferential portion of the aforementioned casing (11);

and which is constructed so that (i) when tile conductive circuit (20) is in an "off" state, the magnetic force of the permanent magnets (4a), (4b), (4c) and (4d) of the vane wheel (3) acts respectively on a core (5a) of the electromagnet(s) (5) and the magnetic body (or bodies) (6) so that the vane wheel (3) is offset toward the aforementioned relatively offset angular position ($P_1$) or ($P_2$) with respect to the electromagnet(s) (5), and (ii) when the conductive circuit (20) is in a conductive state, the repulsive force of the electromagnet(s) (5) acts on the permanent magnets (4a), (4b), (4c) and (4d), thus causing the vane wheel (3) to rotate;

the circumferential edge portions of vanes (3a) of the aforementioned vane wheel (3) are connected by a circumferential-edge ring (3c) across the entire width of said vanes (3a) (with respect to the axial direction).

2. I claim, in a fan motor consists of (i) a rotor (2) which is constructed by positioning a plurality of permanent magnets (4a), (4b), (4c) and (4d) at prescribed relative angles on a circumferential rim portion of a vane wheel (3), and (ii) a stator (10) which is constructed by positioning one or more electromagnet(s) (5) and at least one magnetic body to be placed in one of a plurality of recesses on an inside circumferential portion of a casing (11);

and in which a conductive circuit (20) is connected to a field magnetic coil(s) (5b) of an aforementioned electromagnet(s) (5), (c) the aforementioned recesses [magnetic body (or bodies) (6)] are positioned in a prescribed relatively offset angular position ($P_1$) or ($P_2$) with respect to the aforementioned electromagnet(s) (5), (d) a detector (7) which detects when tile permanent magnets (4a), (4b), (4c) and (4d) of the vane wheel (3) are in the vicinity of the aforementioned relatively offset angular position ($P_1$) or ($P_2$) and which accordingly connects a conductive circuit (20), is attached to the inside circumferential portion of the aforementioned casing (11);

and which is constructed so that (i) when the conductive circuit (20) is in an "off" state, the magnetic force of the permanent magnets (4a), (4b), (4c) and (4d) of the vane wheel (3) acts respectively on a core(s) (5a) of tile electromagnet(s) (5) and the magnetic body (or bodies) (6) so that the vane wheel (3) is offset toward the aforementioned relatively offset angular position ($P_1$) or ($P_2$) with respect to the electromagnet(s) (5), and (ii) when the conductive circuit (20) is in a conductive state, tile repulsive force of tile electromagnet(s) (5) acts on the permanent magnets (4a), (4b), (4c) and (4d), thus causing the vane wheel (3) to rotate;

the relatively offset angular position ($P_1$) or ($P_2$) of a magnetic body (or bodies) (6) is set so that selection is possible between a relatively advanced angular position ($P_1$) and a relatively retarded angular position (P) with respect to the electromagnet(s) (5) such selection which may be made after installation of such fan motor and such selection which will allow a change in direction of rotation of the vane wheel.

3. I claim, a fan motor, as defined in claim 2, which is constructed so that the. relatively advanced angular position ($P_1$) and relatively retarded angular position ($P_2$) (with respect to the electromagnet(s) (5)) are set at respective equal angular positions (theta) from adjacent permanent magnets (4c) and (4d) of the vane wheel (3) in a non-conductive state, and permanent magnet(s) are used for the magnetic body (or bodies) (6), thus causing repulsion of the permanent magnets (4) of the vane wheel (3).

4. I claim, a fan motor, as defined in any of claims 1 through 3, in which a diode ($D_2$) is provided which is connected in parallel with each field magnetic coil (5b), and which forms a closed circuit with said field magnetic coil (5b) when the conduction of the conductive circuit (20) is stopped, so that any surge voltage is absorbed.

* * * * *